United States Patent [19]

McKinney et al.

[11] Patent Number: 4,783,926
[45] Date of Patent: Nov. 15, 1988

[54] FISH GAFF

[75] Inventors: Chris H. McKinney; Barry T. McKinney, both of Granite Quarry, N.C.

[73] Assignee: P. H. McKinney, Granite Quarry, N.C.

[21] Appl. No.: 171,259

[22] Filed: Mar. 21, 1988

[51] Int. Cl.⁴ ............................................. A01K 97/14
[52] U.S. Cl. ......................................... 43/5; 294/19.3
[58] Field of Search ..................... 43/5; 294/19.3, 19.1

[56] References Cited

U.S. PATENT DOCUMENTS

| | | | |
|---|---|---|---|
| 886,003 | 4/1908 | Kraft | 294/19.3 |
| 1,056,343 | 3/1913 | Kromann . | |
| 1,110,213 | 8/1914 | Kratochwill | 294/19.3 |
| 2,136,661 | 11/1938 | Abel | 294/19.3 |
| 2,196,117 | 4/1940 | Lange . | |
| 2,616,753 | 11/1952 | Odnial | 294/19.3 |
| 2,930,648 | 3/1960 | Allan . | |
| 3,041,102 | 7/1962 | Dai | 294/19.1 |
| 3,208,786 | 9/1965 | Eddleman . | |
| 3,833,252 | 9/1974 | Redding . | |
| 3,978,605 | 9/1976 | Maruniak . | |

*Primary Examiner*—Nicholas P. Godici
*Assistant Examiner*—Karen Skillman
*Attorney, Agent, or Firm*—Bell, Seltzer, Park & Gibson

[57] ABSTRACT

The symmetrically operating jaws of the fish gaff are movable between an open and cocked position and a closed fish engaging position. The jaws are normally urged to the closed position to thereby clampingly engage opposite sides of a fish positioned therebetween. A coil spring trigger is connected at opposite ends to medial portions of the jaws and extends in a straight line path across the space between the jaws when in the open and cocked position to maintain the jaws in the open position. The medial portion of the coil spring trigger is engageable by a fish in position between the open jaws so that the coil spring trigger is moved out of the straight line path and releases the jaws so that they are immediately free to clamp the fish therebetween.

7 Claims, 1 Drawing Sheet

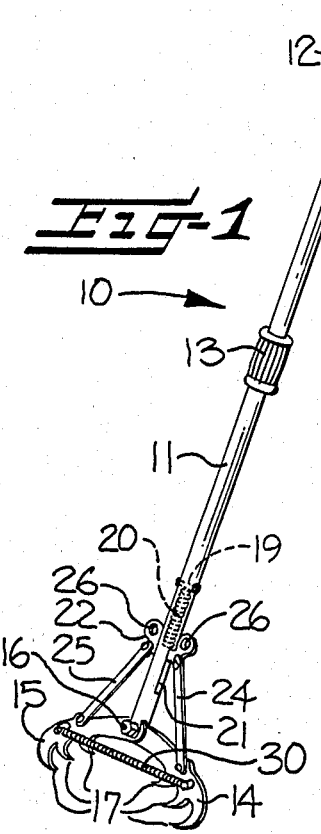
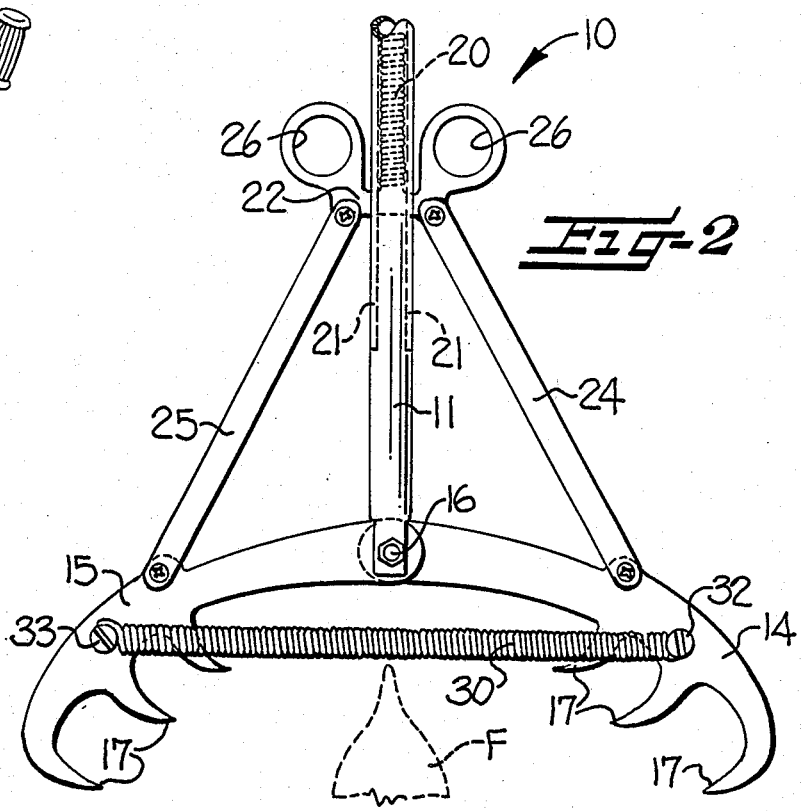
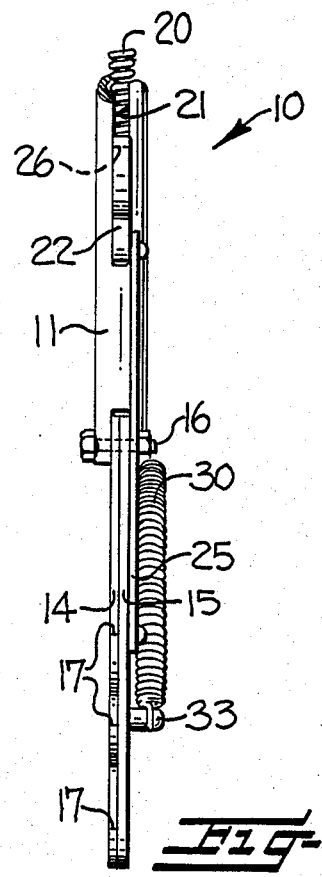
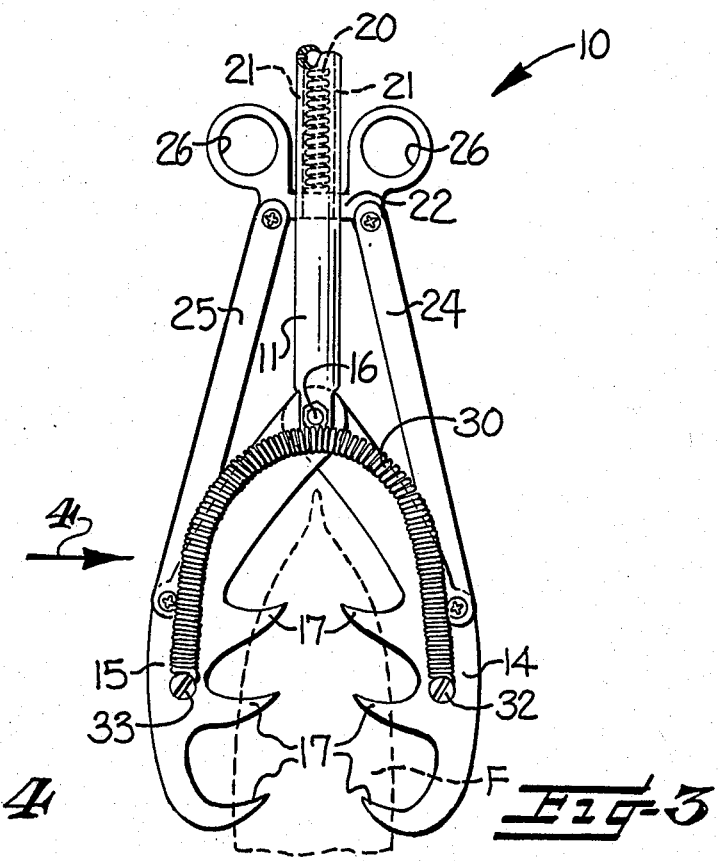

FISH GAFF

FIELD OF THE INVENTION

This invention relates generally to a fish gaff of the type including a pair of complementary jaws movable between a spread-apart open position and a closed position with the jaws in clamping engagement with a fish positioned therebetween, and more particularly to such a fish gaff in which a coil spring trigger extends in a straight line path between the open jaws and is operable to permit the jaws to immediately move to the closed fish engaging position.

BACKGROUND OF THE INVENTION

Many different types of fish retrievers have heretofore been proposed for landing fish after they have been caught and brought to the boat, dock or the like, including nets, hook-like gaffs or grapples, and gaffs of the type which employ a pair of spring loaded and symmetrically operated jaws positioned on opposite sides of the fish in the open and cocked position and then released to grasp or impale the fish from both sides. U.S. Pat. No. 2,924,482 discloses a primary grapple hook which also includes a spring loaded secondary grapple hook for preventing the escape of the fish from the primary hook.

U.S. Pat. Nos. 2,196,117; 2,930,648; 3,833,252; and 3,798,605 disclose fish gaffs including a pair of symmetrically operating jaws for engaging opposite sides of a fish positioned therebetween. The gaffs disclosed in these patents generally require some special type of manual manipulation of the gaff to move the jaws from the open to the closed position.

U.S. Pat. Nos. 1,049,875 and 1,056,343 also generally disclose a fish gaff including symmetrically operating jaws which are normally urged to the closed position by resilient means and also include a mechanical trigger which is released or actuated when a fish is positioned between the open jaws. However, the mechanical trigger mechanisms disclosed in these patents are complicated, require the manufacture and assembly of many complicated parts, and are subject to corrosion, particularly when the fish gaff is used in salt water fishing.

SUMMARY OF THE INVENTION

With the foregoing in mind, it is an object of the present invention to provide a fish gaff including a pair of symmetrically operating and complementary jaws which are normally resiliently urged to a closed position to impale a fish positioned therebetween and which are maintained in an open position by a simple and inexpensive coil spring trigger position to be operated by engagement with a fish so that the jaws immediately move to the closed position in engagement with opposite sides of the fish.

In accordance with the present invention, the fish gaff includes a main body member, in the form of an elongate tubular rod forming a handle. Adjacent end portions of a pair of symmetrically operating and complementary jaws are pivotally supported on one end of the handle. A compression spring is supported in the tubular handle and is operatively associated with the jaws for normally urging them to the closed position to impale a fish positioned therebetween. A coil spring trigger has opposite ends connected to medial portions of the jaws and extends in a straight line path across the space between the jaws when they are in the open position with adjacent coils of the spring trigger in contact to maintain the jaws in the open position. The medial portion of the coil spring trigger is engaged by a fish positioned between the open jaws to move the coil spring trigger out of the straight line path and toward the pivoted support of the jaws so that the compression spring is immediately free to urge the jaws to the closed position and clamp opposite sides of the fish between the jaws.

BRIEF DESCRIPTION OF THE DRAWINGS

Other objects and advantages will appear as the description proceeds when taken in connection with the accompanying drawings, in which FIG. 1 is a side elevational view of the fish gaff of the present invention with the jaws in the open and cocked position;

FIG. 2 is an enlarged fragmentary elevational view of the lower end portion of the fish gaff of FIG. 1;

FIG. 3 is a view similar to FIG. 2 but showing the jaws in a closed position; and FIG. 4 is a side elevational view looking inwardly at the left-hand side of FIG. 3, as indicated by the arrow 4.

DESCRIPTION OF THE PREFERRED EMBODIMENT

As illustrated in FIG. 1, the present fish gaff includes a main body member, broadly indicated at 10, and being illustrated in the form of an elongate handle, in the form of a tubular rod 11 having a hand grip 12 affixed to the upper end and a hand grip 13 affixed to a medial portion thereof. Symmetrically operating and complementary jaws 14, 15 have their adjacent inner end portions pivotally supported, as on a pivot bolt 16, on the lower end of the tubular rod 11. Each of the jaws 14, 15 has concavely curved inner sides with fish engaging impaling teeth 17 extending inwardly therefrom.

The free end portions of the jaws 14, 15 can move between a spread-apart open position, as shown in FIG. 2, and an adjacent closed position, as shown in FIG. 3. Resilient means is operatively associated with the jaws 14, 15 for normally urging the jaws to the closed position to impale a fish, indicated in dash-dot lines at F, positioned between the jaws 14, 15. The resilient means for normally urging the jaws 14, 15 to the closed position includes a compression spring 20 supported within the tubular rod 11 and having its upper end fixed therein, as by a pin 19 fixed in the tubular rod 11 (FIG. 1).

Diametrically opposed sides of the tubular rod 11 are provided with elongate slots 21 (FIG. 2). A cross member 22 extends through the slots 21 and outwardly beyond opposite sides of the tubular rod 11. The medial portion of the cross member 22 is in engagement with the lower end of the compression spring 20. Operating links 24, 25 are pivotally connected at their upper ends to opposite sides of the cross member 22 and their lower ends are pivotally connected to medial portions of the corresponding jaws 14, 15 so that the jaws operate symmetrically as the cross member 22 is moved between the raised and lowered positions in the slots 21. Opposite end portions of the cross member 22 are provided with gripping means in the form of finger engaging openings 26 to permit manual movement of the cross member 22 from the lowered position shown in FIG. 3 to the raised position shown in FIG. 2 so as to compress the compression spring 20 as the jaws 14, 15 are moved to the open and cocked position.

A coil spring trigger 30 has opposite ends pivotally connected to medial portions of the jaws 14, 15, as by shoulder screws 32, 33. The coil spring trigger 13 extends in a straight line path across the space between the jaws 14, 15, when in the open position, as shown in FIGS. 1 and 2. When the coil spring trigger 30 is in this straight line position, the adjacent coils of the spring trigger are in contact and form a rigid connection to maintain the jaws 14, 15 in this open position, against the downward force being exerted by the compression spring against the cross member 22 and normally tending to urge the jaws 14, 15 to the closed position of FIG. 3.

With the fish gaff in the cocked position, with the jaws 14, 15 in the open position, the handle 10 is manipulated by the user to position the jaws 14, 15 adjacent opposite sides of a fish, as indicated in dash-dotted lines at F. The handle 10 is then moved downwardly so that the coil spring trigger 30 engages the upper portion of the fish to move the coil spring trigger 30 out of the straight line path and toward the pivoted support bolt 16. The compression spring 20 is then free to immediately urge the jaws 14, 15 inwardly to the closed position, thereby impaling the teeth 17 into opposite sides of the fish F positioned between the jaws. As soon as the coil spring trigger 30 engages the fish F, it moves to the upwardly curved position shown in FIG. 3. The handle 10 is then lifted upwardly so that the impaled fish can be brought into the boat, dock, or the like.

Once the fish has been landed, it is easily released and the fish gaff is cocked for a subsequent operation by placing the fingers in the openings 26 and raising the cross member 22 along the slots 21 to compress the spring 20 and move the jaws 14, 15 to the open position shown in FIG. 2. During this upward movement of the cross member 22, the links 24, 25 are moved upwardly to spread apart the jaws 14, 15 and to also simultaneously move the coil spring trigger 30 back to the straight line path position extending between the jaws 14, 15 so as to maintain the jaws in the open position.

Thus, the present fish gaff is provided with a simple and inexpensive coil spring trigger 30 which is automatically operated by engagement with a fish positioned between the jaws 14, 15. The coil spring trigger 30 maintains the jaws 14, 15 in the open position when the coil spring trigger 30 is in the straight line position and may be easily moved out of the straight line position by engagement with a fish to immediately free the compression spring 20 so that the jaws 14, 15 are immediately moved into closed and clamping position on opposite sides of the fish. Also, the fish gaff is formed of a few parts which may be easily assembled and which will operate in a trouble-free manner over a long wear life. It is preferred that the parts of the fish gaff be formed of a noncorrosive material, such as stainless steel, so that the fish gaff may be used in salt water fishing without corroding.

In the drawings and specification there has been set forth the best mode presently contemplated for the practice of the present invention, and although specific terms are employed, they are used in a generic and descriptive sense only and not for purposes of limitation, the scope of the invention being defined in the claims.

That which is claimed is:

1. A fish gaff comprising a main body member, a pair of complementary jaws having inner sides with fish engaging and impaling teeth extending inwardly therefrom, means pivotally supporting adjacent end portions of said jaws on one end portion of said main body member so that the free end portions of said jaws can move between a spread-apart open position and an adjacent closed position, resilient means operatively associated with said jaws for normally urging said jaws to said closed position to impale a fish positioned therebetween, and a coil spring trigger having opposite ends connected to medial portions of said jaws and extending in a straight line path across the space between said jaws when in said open position with adjacent coils of said spring trigger in contact to maintain said jaws in said open position, the medial portion of said coil spring trigger being engageable by a fish in position between said open jaws so that said coil spring trigger is moved out of the straight line path and toward the pivoted support means of said jaws so that said resilient means is immediately free to urge said jaws to said closed position and impale said teeth into opposite sides of the fish positioned between said jaws.

2. A fish gaff according to claim 1 wherein said main body member comprises a tubular rod with said pivot means for said jaws being positioned on one end and with the other end portion defining handle means.

3. A fish gaff according to claim 2 wherein said resilient means includes a compression spring extending longitudinally along said tubular rod and adjacent said one end thereof, means fixing the end of said compression spring remote from said one end of said tubular rod thereto, longitudinal slots extending along diametrically opposed sides of said tubular rod, a cross member extending through said slots and outwardly beyond opposite sides of said tubular rod, the medial portion of said cross member being in engagement with the end of said compression spring nearest said one end of said tubular rod, and a pair of operating links operatively connected at one end to the outwardly extending corresponding ends of said cross member and at their other ends to medial portions of the corresponding jaws.

4. A fish gaff according to claim 3 wherein compression spring is positioned within said tubular rod.

5. A fish gaff according to claim 4 including gripping means formed on the outer opposite end portions of said cross member to permit manual movement of said cross member along said slots so as to compress said compression spring and to move said jaws to said open position, thereby moving said coil spring trigger to the straight line locking position for maintaining said jaws in said open position.

6. A fish gaff according to claim 5 wherein said gripping means on said cross member comprises finger gripping openings on the opposite end portions of said cross member.

7. A fish gaff comprising a tubular rod handle, a pair of complementary jaws having concavely curved inner sides with fish engaging and impaling teeth extending inwardly therefrom, means pivotally supporting adjacent end portions of said jaws on one end portion of said tubular rod handle so that the free end portions of said jaws can move between a spread-apart open position and an adjacent closed position, a compression spring, extending along said tubular rod handle and operatively associated with said jaws for normally urging said jaws to said closed position to impale a fish positioned therebetween, and a coil spring trigger having opposite ends pivotally connected to medial portions of said jaws and extending in a straight line path across the space between said jaws when in said open position with adjacent coils of said spring trigger in contact to maintain said jaws in said open position, the medial portion of said coil spring trigger being engageable by a fish in position between said open jaws so that said coil spring trigger is moved out of the straight line path and toward the pivoted support means of said jaws so that said resilient means is immediately free to urge said jaws to said closed position and impale said teeth into opposite sides of the fish positioned between said jaws.

* * * * *